United States Patent [19]

Barry

[11] Patent Number: 5,702,027

[45] Date of Patent: Dec. 30, 1997

[54] BAG DISPENSING DEVICE

[76] Inventor: Michael A. Barry, 1227 E. Ash Ave., Fullerton, Calif. 92631

[21] Appl. No.: 663,403

[22] Filed: Jun. 13, 1996

[51] Int. Cl.$^6$ .................................................. B65G 11/00
[52] U.S. Cl. ........................... 221/84; 221/253; 221/281; 221/283; 193/2 D; 198/733
[58] Field of Search .............................. 221/69–72, 76, 221/82, 84, 85, 253, 259, 36, 281, 283; 193/2 D; 198/733

[56] References Cited

U.S. PATENT DOCUMENTS

| | | | |
|---|---|---|---|
| 1,049,776 | 1/1913 | Stauffer et al. | 221/253 |
| 1,212,662 | 1/1917 | Meyers | 221/82 |
| 2,235,922 | 3/1941 | Friesenhahn | 221/253 |
| 5,052,583 | 10/1991 | Hill | 221/84 |
| 5,141,128 | 8/1992 | Pippin | 221/84 |
| 5,285,927 | 2/1994 | Pruitt | 221/281 |
| 5,405,043 | 4/1995 | Meloney | 221/283 |

*Primary Examiner*—H. Grant Skaggs
*Attorney, Agent, or Firm*—Stetina Brunda Garred & Brucker

[57] ABSTRACT

A bag dispensing device comprising an elongate, tubular housing defining open top and bottom ends. Extending between the top and bottom ends is a passage for receiving and storing a plurality of bags. Extending through the passage and from the open top and bottom ends of the housing is an elongate, flexible dispensing member. The dispensing member is configured such that when pulled from the bottom end of the housing, one of the bags stored within the passage is dispensed from the bottom end.

12 Claims, 1 Drawing Sheet

BAG DISPENSING DEVICE

FIELD OF THE INVENTION

The present invention relates generally to household appliances, and more particularly to a bag dispensing device which is mountable in close proximity to a ceiling or shelf and, when actuated, adapted to dispense one of a plurality of bags stored therewithin.

BACKGROUND OF THE INVENTION

Items purchased at grocery stores and similar retail outlets are frequently packed in medium sized plastic bags as an alternative to the larger, conventional paper bags. Many consumers keep these plastic bags after unloading the purchased items therefrom in view of their utility in relation to other household tasks. In this respect, such plastic bags are frequently used as waste receptacle liners or as trash bags for the immediate disposal of kitchen scraps, soiled diapers, etc.

There is currently known in the prior art devices for dispensing bags such as plastic grocery bags. Such devices typically comprise an elongate tube which is adapted to receive a plurality of bags. Disposed in one end of the tube is a plunger member having an elongate handle extending therefrom. In using the prior art dispensing device, the handle of the plunger member is grasped and pushed downwardly into the tube so as to cause a bag to be dispensed (i.e., pushed) from the opposite end of the tube.

Though the prior art dispensing device meets its intended objective of dispensing bags, it possesses certain deficiencies which detract from its overall utility. In this respect, forcing the plunger member downwardly often results in more than one bag being dispensed from the bottom end of the tube, thus necessitating that the extra bag(s) be forced back into the tube. Additionally, due to the extension of the plunger member, and more particularly the handle thereof, from the top end of the tube, the prior art dispensing device cannot be mounted in close proximity to the underside of an overhanging structure such as a ceiling or shelf. As such, such device must often be mounted to a wall below chest level, thus requiring that the user stoop or bend over to receive the dispensed bag. The need to maintain a substantial gap between the top end of the tube and the underside of the ceiling or shelf also limits the locations in the household in which the prior art dispensing device may be mounted. In this respect, since the top end cannot be placed in close proximity to an overhanging structure, it is difficult to mount such devices in locations such as broom closets, cabinets, or underneath garage shelves.

The present invention overcomes the deficiencies of prior art dispensing devices by providing a device which is mountable in close proximity to a shelf, ceiling or other overhanging structure, and is adapted to dispense only a single bag when actuated.

SUMMARY OF THE INVENTION

In accordance with the present invention, there is provided a bag dispensing device which comprises an elongate, tubular housing defining open top and bottom ends. Extending between the top and bottom ends is a passage for receiving and storing a plurality of bags. The passage has a generally circular cross-sectional configuration, with the housing itself having a generally cylindrical configuration. Formed on the housing are a plurality of mounting lugs for facilitating the attachment thereof to a vertical support surface such as a wall.

In addition to the housing, the dispensing device of the present invention comprises an elongate, flexible dispensing member which extends through the passage and from the open top and bottom ends of the housing. The dispensing member is configured such that when pulled from the bottom end of the housing, one of the bags stored within the passage is dispensed from the bottom end. The dispensing member preferably comprises a continuous rope which is knotted at equidistantly spaced intervals along the length thereof. The rope is preferably fabricated from nylon, with the housing preferably being fabricated from polyvinyl chloride (PVC). To aid in the receipt of the dispensed bag from the housing, the bottom end thereof preferably has a beveled configuration.

BRIEF DESCRIPTION OF THE DRAWINGS

These, as well as other features of the present invention, will become more apparent upon reference to the drawings wherein.

DETAILED DESCRIPTION OF THE PREFERRED EMBODIMENT

Figure 1:
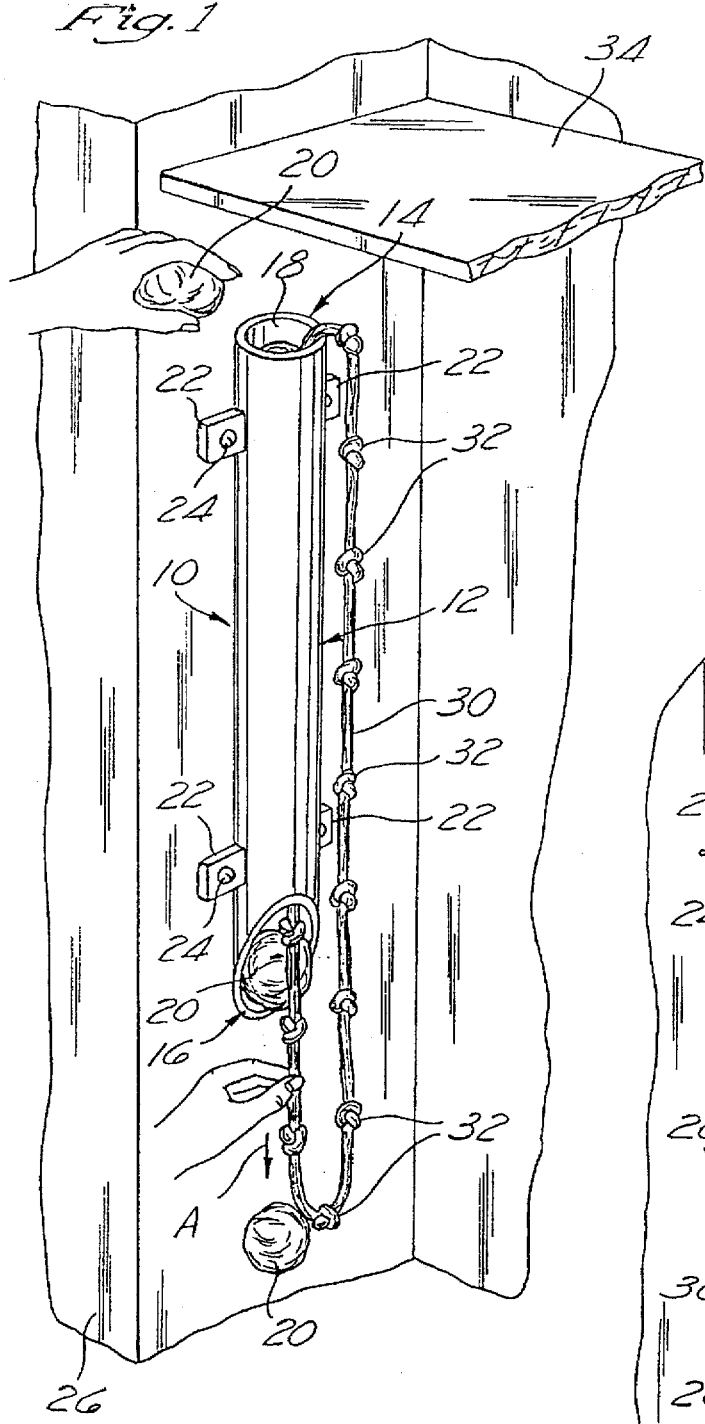
FIG. 1 is a front perspective view of the bag dispensing device of the present invention as mounted to a vertical support surface.
Figure 2:
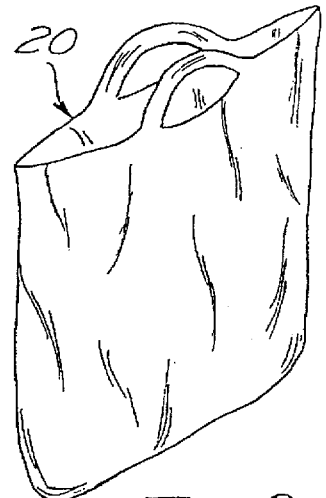
FIG. 2 is a perspective view of a exemplary bag for storage within the dispensing device shown in FIG. 1.
Figure 3:
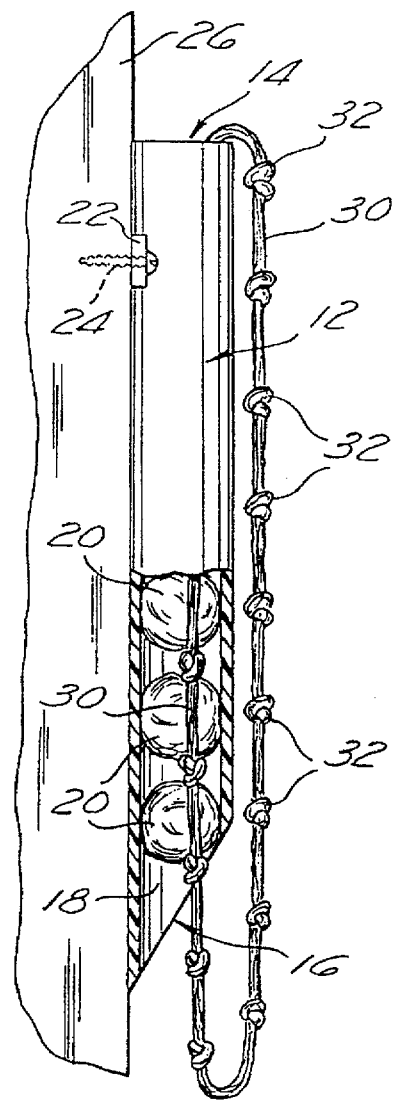
FIG. 3 is a partial cross-sectional view of the bag dispensing device shown in FIG. 1.

Referring now to the drawings wherein the showings are for purposes of illustrating a preferred embodiment of the present invention only, and not for purposes of limiting the same, FIGS. 1 and 3 illustrate the bag dispensing device 10 constructed in accordance with the present invention. The dispensing device 10 comprises an elongate, tubular housing 12 which defines an open top end 14 and an open bottom end 16. The bottom end 16 of the housing 12 preferably has a beveled configuration for reasons which will be discussed in more detail below. Extending longitudinally between the top and bottom ends 14, 16 is a passage 18 which is adapted to receive and store a plurality of compacted (i.e., crumpled) plastic bags 20. The plastic bags 20 are typically of the variety used to package items in grocery stores, with an exemplary bag 20 being shown in its normal, uncollapsed configuration in FIG. 2. Those of ordinary skill in the art will recognize that the dispensing device 10 has utility in relation to the dispensation of other types of bags as well.

In the preferred embodiment, the tubular housing 12 has a generally cylindrical configuration, and is fabricated from polyvinyl chloride (PVC), though other similar materials may be utilized as an alternative. Additionally, the passage 18 extending longitudinally through the housing 12 preferably has a generally circular cross-sectional configuration. However, those of ordinary skill in the art will also recognize that the housing 12 and/or passage 18 extending therethrough may be provided in alternate configurations (e.g., square, triangular, etc.).

Integrally formed on the housing 12, and in particular the outer surface thereof, are a plurality of mounting lugs 22. In the preferred embodiment, the housing 12 includes four (4) mounting lugs 22 formed thereon, with one opposed pair being formed on the housing 12 in close proximity to the top end 14 thereof, and another opposed pair being formed on the housing 12 in close proximity to the bottom end 16 thereof. As shown in FIG. 1, the mounting lugs 22 have generally rectangular configurations, though they may be formed to have alternative configurations. Disposed within each of the mounting lugs 22 and extending therethrough is an aperture which is adapted to accommodate a fastener 24 such as a screw. As shown in FIGS. 1 and 2, the mounting lugs 22 are used to facilitate the mounting of the dispensing device 10 upon a vertically oriented support surface 26 such as a closet or cabinet wall. Though not shown, it will be recognized that the dispensing device 10 need not include the mounting lugs 22, and may be provided with alternate means for mounting the same to the support surface 26. In this respect, separate components such as horseshoe clamps which are sized to accommodate the housing 12 may be used to facilitate such mounting.

The dispensing device 10 of the present invention further comprises an elongate, flexible dispensing member 28 which extends through the passage 18 and from the open top and bottom ends 14, 16 of the housing 12. In the preferred embodiment, the dispensing member 28 comprises a continuous rope 30 which is knotted along its length. In this respect, the knots 32 are preferably provided in the rope 30 at equidistantly spaced intervals/locations along the length thereof. As will be recognized, to make the dispensing member 28 continuous, one of the knots 32 is formed by tying the opposed ends of the rope 30 to each other. The rope 30 is preferably fabricated from nylon, though other suitable materials of similar strength may be used as an alternative.

As seen in FIGS. 1 and 2, the dispensing device 10 is used by initially storing a plurality of bags 20 within the passage 18 of the housing 12. Typically, the bags 20 are inserted into the passage 18 via the open top end 14 of the housing 12 as shown in FIG. 1, though they may also be inserted into the passage 18 via the bottom end 16. The insertion of successive bags 20 into the top end 14 causes the dispensing member 28 to be moved in the direction shown by the arrow A in FIG. 1, i.e., a counter-clockwise direction.

Subsequent to filling the passage 18 with collapsed bags 20, a single bag 20 may be dispensed from the bottom end 16 of the housing 12 simply by grasping and pulling the dispensing member 28 extending from the bottom end 16 in the direction of the arrow A, as also shown in FIG. 1. As seen in FIG. 2, each bag 20 stored within the passage 18 is typically oriented between a respective pair of the knots 32. As such, pulling the dispensing member 28 downwardly in the manner shown in FIG. 1 results in only one (1) bag 20 being dispensed from the bottom end 16. Advantageously, the beveled configuration of the bottom end 16 of the housing 12 aids in the receipt of the dispensed bag 20 therefrom. Even if more than one bag 20 is oriented between a respective pair of the knots 32, pulling the dispensing member 28 in a controlled manner still typically results in only one bag 20 being dispensed from the bottom end 16, with the other bags 20 being frictionally retained within the passage 18.

As further seen in FIG. 1, due to the absence of any type of plunger member or similar component in the dispensing device 10, the top end 14 of the housing 12 may be mounted in relative close proximity to an overhanging structure such as a closet shelf 34 (shown in FIG. 1), ceiling, or similar structure. In this respect, due to the manner in which the bags 20 are loaded into the top end 14, only a relatively narrow gap is needed between the top end 14 and shelf 34 or other overhanging structure to facilitate such loading. Thus, the dispensing device 10 of the present invention provides advantages over prior art devices which include plunger members in that the dispensing device 10 may be mounted at chest level in virtually any location within the household. Indeed, the dispensing device 10 need not be mounted at a low level to avoid an overhanging structure.

Additional modifications and improvements of the present invention may also be apparent to those skilled in the art. Thus, the particular combination of parts described and illustrated herein is intended to represent only one embodiment of the present invention, and is not intended to serve as limitations of alternative devices within the spirit and scope of the invention.

What is claimed is:

1. A bag dispensing device, comprising:

an elongate, tubular housing defining open top and bottom ends which have a passage extending therebetween for receiving a plurality of bags; and an elongate, flexible dispensing member comprising a continuous rope which is knotted along its length extending through the passage and from the open top and bottom ends of the housing;

said dispensing member being configured such that when pulled from the bottom end of the housing, one of the bags stored within the passage will be dispensed from the bottom end.

2. The device of claim 1 wherein the bottom end of the housing has a beveled configuration.

3. The device of claim 1 wherein said passage has a generally circular cross-sectional configuration.

4. The device of claim 3 wherein said housing has a generally cylindrical configuration.

5. The device of claim 1 wherein said housing further comprises a plurality of mounting lugs formed thereon.

6. The dispensing device of claim 1 wherein the rope is knotted at equidistantly spaced intervals along the length thereof.

7. The dispensing device of claim 1 wherein the rope is fabricated from nylon.

8. The dispensing device of claim 1 wherein the housing is fabricated from polyvinyl chloride.

9. A bag dispensing device, comprising:

an elongate, tubular housing defining opposed open ends and sized to receive a plurality of bags; and an elongate, flexible dispensing member extending through the housing and from the opposed ends thereof;

said dispensing member comprising a continuous rope knotted along its length such that when said rope is pulled from one of the open ends of the housing, a stored bag is dispensed therefrom.

10. The dispensing device of claim 9 wherein said housing further comprises a plurality of mounting lugs formed thereon.

11. A bag dispensing device, comprising:

an elongate, tubular housing defining opposed open ends; and an elongate, flexible extending continuous rope which is knotted along its length extending through the housing and from the opposed ends thereof.

12. The dispensing device of claim 11 wherein said housing further comprises a plurality of mounting lugs formed thereon.

* * * * *